March 19, 1929.  A. J. KERCHER ET AL  1,705,769
ELECTRIC AIR HEATER
Filed March 31, 1926
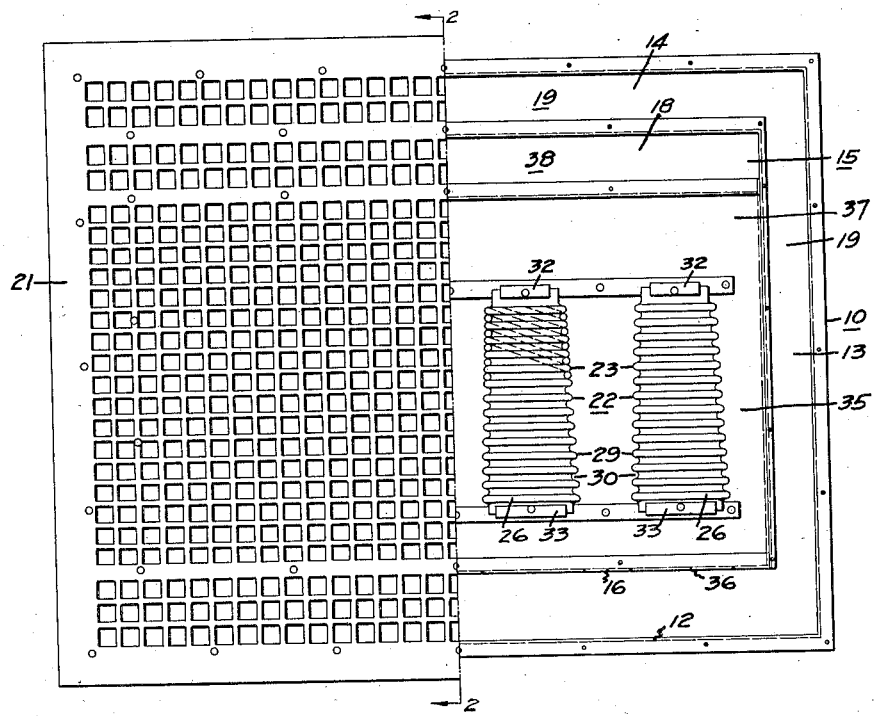
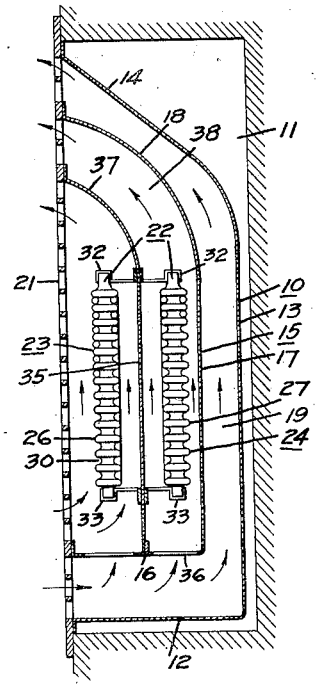
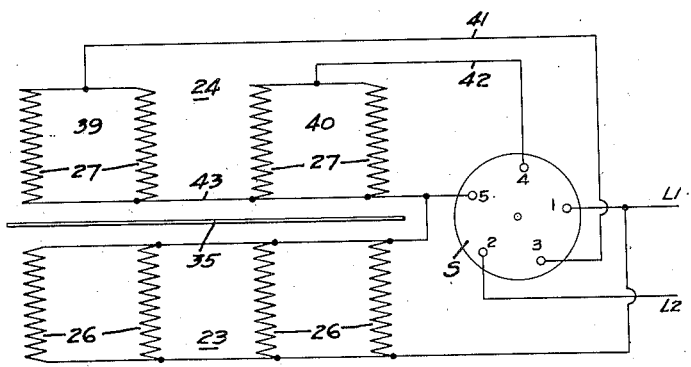
INVENTORS
Arthur J. Kercher
William Wesley Hicks
BY White Frost
their ATTORNEYS.

Patented Mar. 19, 1929.

1,705,769

UNITED STATES PATENT OFFICE.

ARTHUR J. KERCHER, OF BERKELEY, AND WILLIAM WESLEY HICKS, OF SAN FRANCISCO, CALIFORNIA.

ELECTRIC AIR HEATER.

Application filed March 31, 1926. Serial No. 98,698.

This invention relates generally to electric air heaters and is a continuation in part of the subject matter disclosed in our copending application entitled "Electric heater", Serial No. 698,089, filed March 10, 1924.

In heating a room it is necessary to have a heater which is capable of providing sufficient heat to raise the temperature of the air to the desired degree and which is provided with means for controlling the amount of heat produced in order to maintain the temperature at that point. It has been found that the use of radiant heat for heating a room is not as efficient as to heat the air by convection currents, as radiant heat is absorbed by the walls and other objects and is not wholly imparted to the air. On the other hand, a heater which does not directly radiate or which has no visible glowing elements does not give a sense of warmth to the room.

It is an object of this invention to combine the efficiency of a convection type of heater with the desirable effect of a radiant heater.

It is a further object of this invention to devise a combined convection and radiant electric air heater in which the total heating effect may be varied independently of the radiated heat.

It is a further object of this invention to employ both glowing and non-glowing electric heating elements for a heater and to control the current in the non-glowing elements for varying the total heating effect.

Further objects of this invention will appear from the following description in which we have set forth the preferred embodiment of our invention. It is to be understood that various structural changes may be made within the scope of the appended claims.

Referring to the drawings:

Figure 1 is a front view of a heater embodying the principles of this invention, a portion of the grille being cut away.

Fig. 2 is a transverse sectional view taken along the line 2—2 of Fig. 1.

Fig. 3 is a wiring diagram showing the connections for the heating elements.

The invention has been disclosed as incorporated with a wall type of heater such as shown and claimed in the patent of W. W. Hicks, entitled "Electric heater", Serial No. 1,518,067. Such a heater comprises generally a housing 10 which is adapted to be placed in a wall recess 11, the housing including a bottom wall 12, back wall 13, and upper forwardly inclined wall 14. Positioned within the housing 10 and spaced from the walls thereof there is a shell 15 which is similarly provided with a bottom wall 16, back wall 17 and upper forwardly inclined wall 18. Thus, an unobstructed flue 19 for convection currents of air is thereby provided which entirely surrounds the shell 15. The front portion of the housing is inclosed by a foraminous grille 21 so that convection currents of air are free to pass into and out of the housing. The electrical heating means, designated generally at 22, are positioned within the housing immediately behind the grille 21.

The electrical heating means comprises a plurality of heating elements which are preferably divided into two groups 23 and 24, the elements of group 23 being adapted to radiate heat directly from the housing while the elements of group 24 serve only to impart heat to convection currents of air. The individual heating elements 26 of the group 23 are preferably positioned adjacent the open side of the housing 10 so as to be visible from the front of the heater, while the elements 27 of the group 24 are preferably positioned to the rear of the elements 26 so as to have substantially no effect upon the appearance of the heater.

The individual elements 26 and 27 may be constructed in any suitable manner, the particular type shown comprising a relatively flat refractory support 29 which is provided with double grooves 30 upon which are wound suitable resistance conductors 31. The refractory support members 29 are suitably mounted in vertical position by end brackets 32 and 33, which brackets may be secured to a dividing wall 35 positioned within the shell 15. The bottom wall 16 of the shell 15 may be provided with openings 36 and the upper portion of the dividing wall 35 may be provided with a forwardly curved portion 37 so as to define a flue 38 for the passage of convection currents of air. It will be noted that when the elements 27 of the group 24 are heated in this manner they are adapted to heat principally by imparting heat to convection currents of air. On the other hand, the elements of the group 23 being positioned immediately behind the open grille 21 may radiate a large portion of their heat directly from the housing.

The elements of the group 23 are preferably operated at a glowing temperature and the current varied in the elements of group 24 in order to vary the total heating effect of the heater. One form of switching means for performing this result is shown diagrammatically in Fig. 3. The current supply lines $L^1$ and $L^2$ are shown as connected to points 1 and 2 of a suitable manually operable switch. The heating elements 26 are shown as connected across the line $L^1$ and the contact point 5, while the elements of group 24 are preferably divided into two sections 39 and 40 which are respectively connected to the switch contacts 3 and 4 by connectors 41 and 42. The other terminals of the sections 39 and 40 may be connected together by a common conductor 43. With this arrangement when the switch S is turned to "high" position, then switch points 1, 2, 3 and 4 are connected together and all of the resistance elements are connected to lines $L^1$ and $L^2$. The resistance of the elements 26 is preferably such that they are heated to glowing temperature to radiate the heat directly from the housing. The resistance of the elements 27 may be such as to either cause them to operate at a glowing or a non-glowing temperature although to aid in maintaining the walls of the housing 10 as cool as possible, it is preferable to operate these elements at a non-glowing temperature. When these elements are operated at a glowing temperature the walls 17 and 35 serve to absorb radiated heat so that in any event the heating elements of the group 24 will serve as an electrical heating means for heating air only by convection. After the air in the room has been raised to the desired temperature with all of the heating elements in operation, the current controlled by the elements 27 may be decreased in order to decrease the total heating effect independently of the elements 26. Thus, if the switch S be turned to "medium" position the switch contact 4 will be disconnected from the line $L^2$ so that current is consumed in the section 39 of the group 24 and in the group 23. The total heating effect may be further varied by turning the switch S to "low" position in which both contacts 3 and 4 are disconnected from the line $L^1$ so that only the elements 26 are in operation.

It will be observed that this manner of controlling the total heat effect need not alter the general appearance of the heater since the current in the elements 26 is not varied. Furthermore it approximates the efficiency of a heater operating wholly by convection currents. It is to be understood that the principles of the invention are applicable to all forms of electric air heaters within the scope of the appended claims.

We claim:

1. In an electrical air heater, a housing having a back wall, a grille secured to the front of said housing, an upstanding front wall disposed within the housing, a wall interposed between said front wall and the back wall and spaced from the same, said walls forming a plurality of passages open at their upper and lower ends to permit free passage of convection currents of air, electrical heating means disposed between the front wall and said grille, and electrical heating means disposed between said front wall and the next adjacent wall.

2. In an electrical air heater, a housing having an upstanding back wall, a grille secured to the front of said housing, an upstanding wall disposed between the grille and back wall whereby a flue for convection currents of air is formed between the front and back walls, an electrical heating element of the exposed conductor type disposed between the front wall and the grille and adapted to be heated to radiating temperature, another heating element disposed to the rear of the first element and adapted to heat principally by convection, an electrical circuit for energizing said elements, and switch means for independently disconnecting said last named element.

In testimony whereof, we have hereunto set our hands.

ARTHUR J. KERCHER.
WILLIAM WESLEY HICKS.